(No Model.)

J. M. COE.
HAY STACKER.

No. 300,955. Patented June 24, 1884.

WITNESSES:
W. W. Hollingsworth
W. X. Stevens

INVENTOR:
John M. Coe
BY Munn & Co.
ATTORNEYS.

UNITED STATES PATENT OFFICE.

JOHN M. COE, OF SLOAN, IOWA.

HAY-STACKER.

SPECIFICATION forming part of Letters Patent No. 300,955, dated June 24, 1884.

Application filed September 11, 1883. (No model.)

*To all whom it may concern:*

Be it known that I, JOHN M. COE, a citizen of the United States, residing at Sloan, in the county of Woodbury and State of Iowa, have invented a new and useful Improvement in Hay-Stackers, of which the following is a specification.

This invention relates to that class of hay-stackers used to take hay from the ground, elevate it to the desired height, and then drop it upon the stack, to be stowed away by an attendant.

The invention consists in the construction and combination of parts forming a hay-stacker, hereinafter described and claimed, reference being had to the accompanying drawings, in which—

Figure 1:
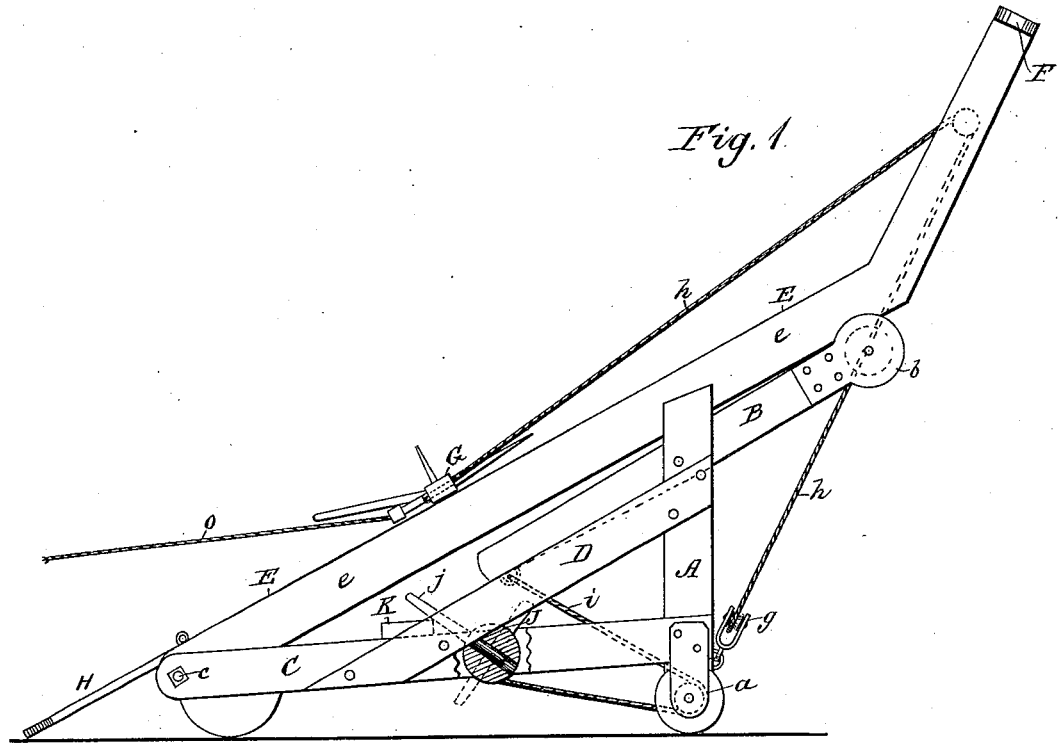
Figure 2:
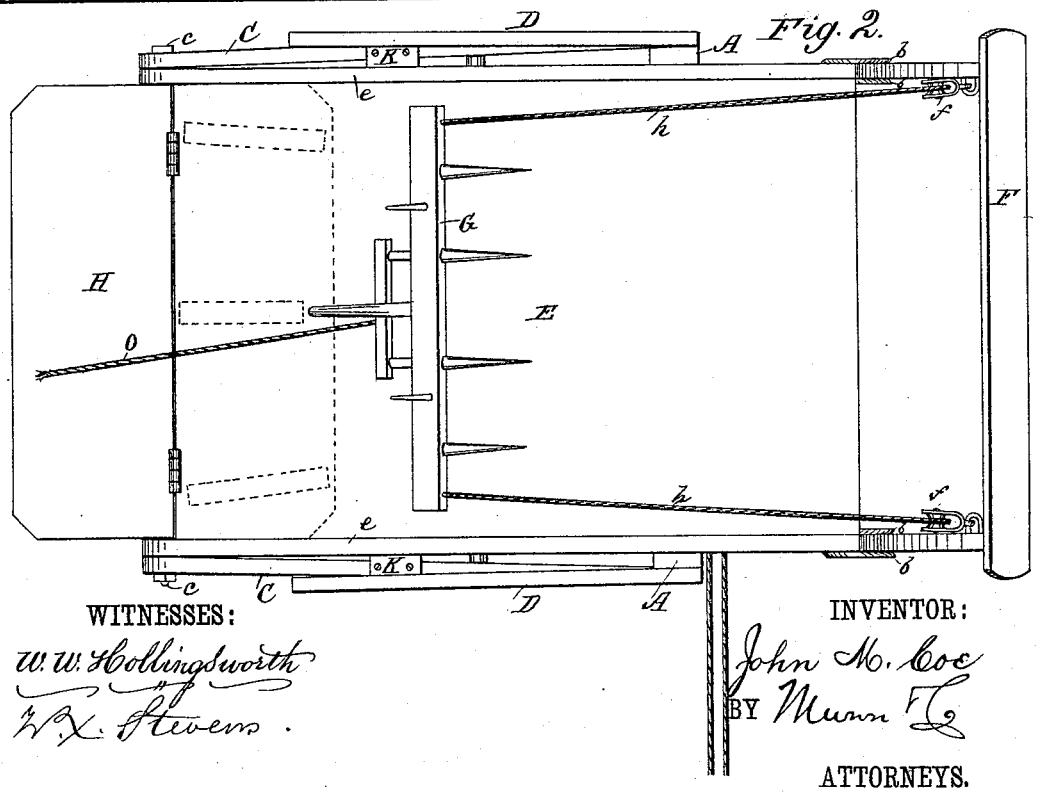

Figure 1 is a side elevation, partly in section, and Fig. 2 is a plan view, of my hay-stacker.

A represents two upright side posts rigidly framed together and mounted on wheels.

C C are two longitudinal beams framed to said posts and stayed thereto by braces D.

K is a cross-bar joining the side beams C C.

E is a floor hinged by bolts c to swing between the ends of the side beams C. The side beams e e of the floor extend beyond its upper end, rising at an angle of about thirty degrees from its plane, and are connected at their upper ends by a cross-beam, F.

B B are two levers arranged to rock on journals in the side posts near their tops, to elevate and support the upper end of the floor by means of ropes i, attached to the lower ends of the levers, running over pulleys a on the lower part of the frame to a roller or windlass, J, journaled in the side beams, on which roller they are wound and rigidly held by means of handspikes j, which first serve as levers to turn the roller by, and then, being free in their holes, one of them is pushed out far enough to come in contact with the cross-bar K, preventing the roller J from turning under strain of the aforesaid ropes i. The upper end of each lever B is provided with two flanges, b, rising one at each side of the side beam e to keep it in place thereon. Between each pair of flanges b may be a roller to lessen friction in raising the floor as the levers swing beneath the beam. The height of the side posts, the length of the levers, and length of the floor will be adapted to the size of stacks required to be raised thereby.

H is a leaf hinged at one edge to the lower end of the floor to lie over on the floor while the stacker is being moved, and to rest its other edge on the ground when in use, forming an extension of the floor to the ground, however uneven the ground may be.

Each of the side beams carries a pulley, $f$, over which ropes $h$ extend from the sides of a rake, G, around swivel-pulleys $g$ to the team, which, drawing upon said ropes, slides the rake up the floor. The rake will usually descend of its own weight; but it is supplied with a return-line, O, by means of which an attendant may pull the rake down the incline of the floor. The location of pulleys $f$ is at a sufficient distance beyond the end of the floor, so that the rake may be drawn with its load completely therefrom. In use the rake is drawn back by an attendant over a quantity of hay and guided to gather it from the ground at the foot of the stackers. The team is set in motion to haul on ropes $h$. The hay is slid up the floor and dumped over its upper edge upon the stack. The pulleys $f$, being located beyond the end of the floor, permit the rake and its load to be hauled completely off from the end of the floor, and the same pulleys, being elevated above the plane of the floor, support the rake by the ropes thereon so high that the rake may be pulled back onto the floor by the return-rope O.

The floor-boards need not be close together. They are merely a slideway for hay to be drawn upon, and longitudinal slats or boards placed a little distance apart would answer the same purpose.

What I claim as my invention, and wish to secure by Letters Patent, is—

1. A supporting-frame and a floor hinged at its lower end thereto, in combination with levers also pivoted thereto beneath said floor, and supporting the upper end of the floor on one end of each of said levers, ropes attached to their other ends, and a windlass journaled in the frame to wind said ropes, as described.

2. The combination, with a frame, of a floor hinged at its lower end thereto, supporting side beams therefor, the side beams of said floor extending beyond its upper end and rising above its plane, pulleys pivoted on the extended beams, and means for raising and lowering said floor and its side beams, substantially as specified.

3. The combination, with the hinged floor, supporting-levers, and windlass described, of a beam crossing the frame practically parallel with said windlass, and one or more hand-spikes loosely fitting holes in the windlass-roller, and adapted to engage said beam when extended through the roller, as specified.

4. A supporting-frame and a floor or slide-way hinged at its lower end thereto to swing vertically thereon, in combination with a leaf or gang-plank hinged at one edge thereto, and free at its other edge to swing vertically, substantially as described, whereby said gang-plank may remain resting one edge on the ground while the slideway is elevated without being broken off thereby, and whereby said plank may be folded over upon said slideway for transportation, as described.

JOHN M. COE.

Witnesses:
   FRED. W. SCHREIBER,
   FRANK MOREHOUSE.